(12) United States Patent
Pierce et al.

(10) Patent No.: US 12,718,297 B2
(45) **Date of Patent: *Aug. 25, 2026**

(54) CONTEXT BASED MESSAGING

(71) Applicant: Chicago Mercantile Exchange Inc., Chicago, IL (US)

(72) Inventors: Carrick Pierce, New York, NY (US); Matthew Morano, Tenafly, NJ (US); James Bradley, Boulder, CO (US)

(73) Assignee: Chicago Mercantile Exchange Inc., Chicago, IL (US)

(*) Notice: Subject to any disclaimer, the term of this patent is extended or adjusted under 35 U.S.C. 154(b) by 182 days.

This patent is subject to a terminal disclaimer.

(21) Appl. No.: 18/824,662

(22) Filed: Sep. 4, 2024

(65) Prior Publication Data

US 2024/0428332 A1 Dec. 26, 2024

Related U.S. Application Data

(63) Continuation of application No. 17/992,071, filed on Nov. 22, 2022, now Pat. No. 12,106,368, which is a continuation of application No. 17/403,352, filed on Aug. 16, 2021, now Pat. No. 11,538,108, which is a continuation of application No. 16/830,947, filed on Mar. 26, 2020, now Pat. No. 11,127,077, which is a continuation of application No. 15/282,302, filed on Sep. 30, 2016, now Pat. No. 10,636,089.

(51) Int. Cl.

| | |
|---|---|
| ***H04L 51/04*** | (2022.01) |
| ***G06Q 40/04*** | (2012.01) |

(52) U.S. Cl.
CPC ............ *G06Q 40/04* (2013.01); *H04L 51/04* (2013.01)

(58) Field of Classification Search
CPC ................................ G06Q 40/04; H04L 51/04
USPC ........................................................ 709/206
See application file for complete search history.

(56) References Cited

U.S. PATENT DOCUMENTS

| | | | |
|---|---|---|---|
| 5,864,827 A | 1/1999 | Wilson | |
| 6,393,460 B1 | 5/2002 | Gruen et al. | |
| 6,430,602 B1 | 8/2002 | Kay et al. | |
| 6,601,044 B1 | 7/2003 | Wallman | |
| 6,629,082 B1 | 9/2003 | Hambrecht et al. | |
| 6,980,983 B2 | 12/2005 | Banerjee et al. | |
| 7,487,112 B2 | 2/2009 | Barnes, Jr. | |
| 7,487,248 B2 | 2/2009 | Moran et al. | |
| 7,548,848 B1 | 6/2009 | Deb et al. | |
| 7,620,407 B1 | 11/2009 | Donald et al. | |
| 8,176,127 B2 | 5/2012 | Keen, Jr. et al. | |
| 8,301,545 B1 | 10/2012 | Shah | |
| 8,332,305 B1 | 12/2012 | Forsythe | |
| 8,458,085 B1 | 6/2013 | Yakubov | |
| 8,635,296 B2 | 1/2014 | Keen, Jr. et al. | |
| 9,100,221 B2 * | 8/2015 | Appelman | H04L 51/046 |
| 9,230,280 B1 | 1/2016 | Maag et al. | |

(Continued)

*Primary Examiner* — Karen C Tang
(74) *Attorney, Agent, or Firm* — Lempia Summerfield Katz LLC

(57) ABSTRACT

Systems and methods are provided for monitoring a plurality of chat messages. Values are extracted from multiple chat messages between a first party and a second party. Context is determined for the values and/or messages. The context is used to determine the relationship between the values, messages, and one or more transactions. Once all values of a transaction are identified, an order ticket is generated.

36 Claims, 10 Drawing Sheets

(56) References Cited

U.S. PATENT DOCUMENTS 10,275,778 B1 4/2019 Maag et al.
10,438,285 B1 10/2019 Konstantinides et al.
10,708,216 B1 7/2020 Rao
2001/0003177 A1 6/2001 Schena et al.
2002/0007335 A1 1/2002 Millard et al.
2002/0010803 A1 1/2002 Oberstein et al.
2002/0038282 A1 3/2002 Montgomery
2002/0086706 A1 7/2002 Chen et al.
2002/0138579 A1 9/2002 Goldberg
2003/0033302 A1 2/2003 Banerjee et al.
2003/0069836 A1 4/2003 Penney et al.
2003/0079024 A1 4/2003 Hough et al.
2003/0167279 A1 9/2003 Smiga et al.
2003/0233309 A1 12/2003 Matus et al.
2003/0233420 A1 12/2003 Stark et al.
2004/0059666 A1 3/2004 Waelbroeck et al.
2004/0068567 A1 4/2004 Moran et al.
2004/0078354 A1 4/2004 Pass
2004/0078596 A1 4/2004 Kent, Jr. et al.
2004/0168055 A1 8/2004 Lord et al.
2004/0210511 A1 10/2004 Waelbroeck et al.
2004/0215731 A1 10/2004 Tzann-en Szeto
2004/0260710 A1 12/2004 Marston et al.
2005/0021445 A1 1/2005 Caro
2005/0021639 A1 1/2005 Wang et al.
2005/0084100 A1 4/2005 Spies et al.
2005/0160031 A1 7/2005 Hendrickson
2005/0267836 A1 12/2005 Crosthwaite
2006/0026091 A1 2/2006 Keen, Jr.
2006/0041684 A1 2/2006 Daniell et al.
2006/0080220 A1 4/2006 Samuel et al.
2006/0095511 A1 5/2006 Munarriz et al.
2006/0101329 A1 5/2006 Han et al.
2006/0167994 A1 7/2006 Chen et al.
2006/0240852 A1 10/2006 Al-sarawi
2007/0043646 A1 2/2007 Morris
2007/0094329 A1 4/2007 Cameron
2008/0168138 A1* 7/2008 Simpson ................ G06Q 40/04
709/204
2008/0250107 A1 10/2008 Holzer et al.
2009/0006236 A1 1/2009 Fitzpatrick et al.
2009/0254616 A1 10/2009 Cheung et al.
2010/0082754 A1 4/2010 Bryan et al.
2011/0238557 A1 9/2011 Barry
2012/0259756 A1 10/2012 Ravisankar et al.
2013/0198296 A1 8/2013 Roy et al.
2013/0211946 A1 8/2013 Montgomery
2014/0143027 A1 5/2014 Tota et al.
2014/0310365 A1 10/2014 Sample et al.
2015/0074191 A1 3/2015 Feng et al.
2015/0082357 A1 3/2015 Torok et al.
2015/0235143 A1 8/2015 Eder
2017/0295119 A1 10/2017 Rosenberg et al.
2018/0005216 A1 1/2018 Delaney et al.
2024/0346527 A1* 10/2024 Weiss .................... G06Q 40/12

* cited by examiner

CONTEXT BASED MESSAGING

RELATED APPLICATIONS

This application claims priority to and the benefit as a continuation under 37 C.F.R. 1.53(b) of U.S. patent application Ser. No. 17/992,071, filed Nov. 22, 2022, now U.S. Pat. No. 12,106,368, which claims priority to and the benefit as a continuation under 37 C.F.R. 1.53(b) of U.S. patent application Ser. No. 17/403,352, filed Aug. 16, 2021, now U.S. Pat. No. 11,538,108, which claims priority to and the benefit as a continuation under 37 C.F.R. 1.53(b) of U.S. patent application Ser. No. 16/830,947, filed Mar. 26, 2020, now U.S. Pat. No. 11,127,077, which claims priority to and the benefit as a continuation under 37 C.F.R. 1.53(b) of U.S. patent application Ser. No. 15/282,302, filed Sep. 30, 2016, entitled, now U.S. Pat. No. 10,636,089, the entirety of all of which are incorporated by reference herein and relied upon.

BACKGROUND

Trading of equity, fixed income security, currency, commodity, options, or futures, has been done in this country since the late 1700s. Traditionally, such trades have occurred on floor-based exchanges, such as the New York Stock Exchange (NYSE) or the American Stock Exchange (AMEX). The predominant method of trading in these floor-based environments is known as the "open outcry" system, which involves oral communications between market professionals at a central location in open view of other market professionals. In this system, an order is typically relayed out to a trader standing in a "pit." The trader shouts out that he has received an order and waits until a broker shouts back contract terms, and a trading transaction then results. Recently, trading processes have been updated to electronic exchanges of information. One popular method of communication between traders and brokers is instant messaging (IM) also known as chat messaging.

Chat/IM clients provide a central interface presenting time-ordered messages from one or more senders, and the user's responses thereto. Current chat clients characterize messages only by the identity of the sender/recipient and the time of creation/receipt. Current chat clients can recognize quotes on a line-by-line basis, i.e., based on the content of a single message but only assuming the message contains sufficient information. However, where the information relating to a particular quote is spread across multiple messages, which may be interspersed among other messages, the chat/IM client is unable to determine the context of these related messages. Accordingly, there is a need for systems and methods that can select and identify correctly, values for transactions from multiple messages using contextual clues.

DETAILED DESCRIPTION

Figure 1:
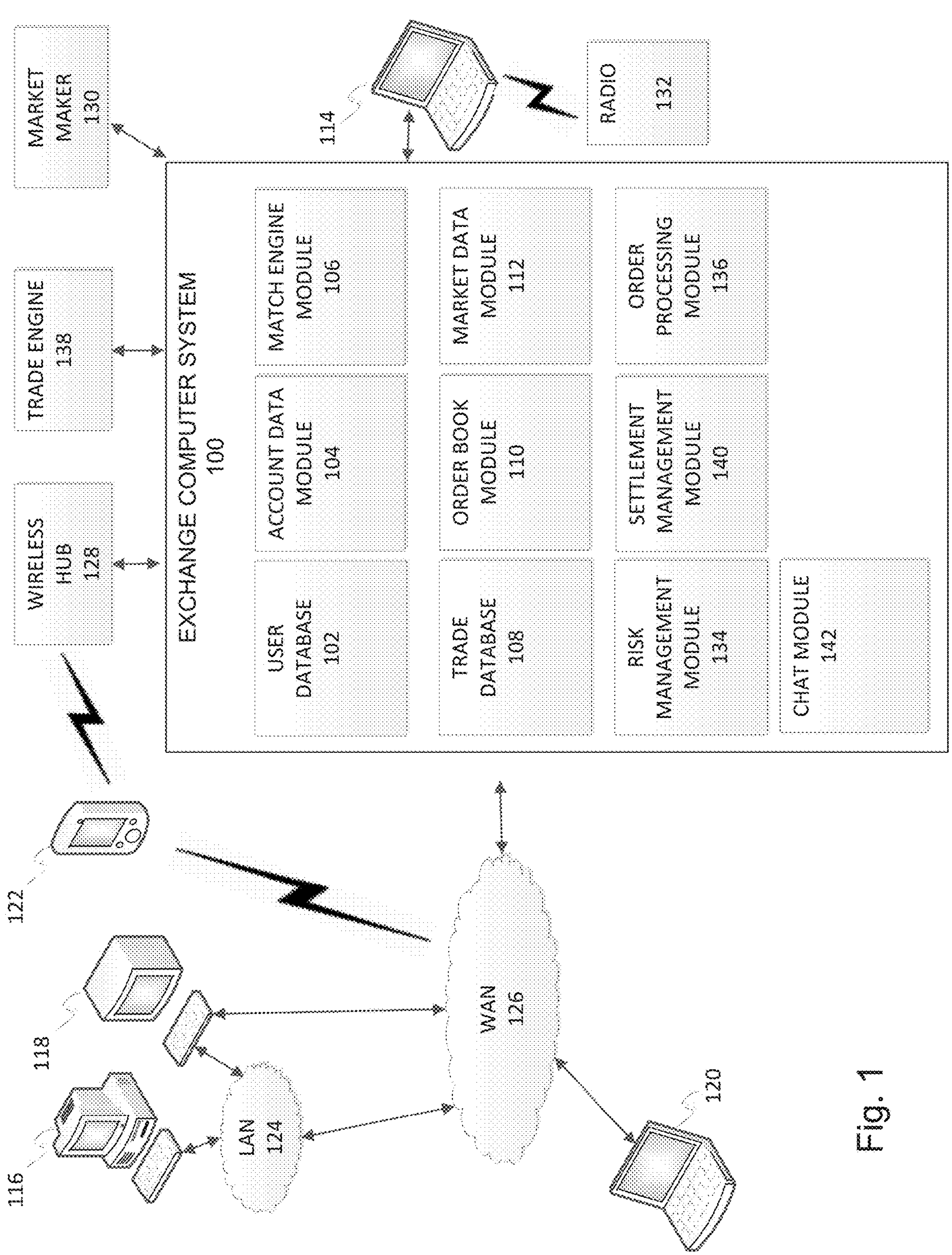
FIG. 1 depicts an illustrative computer network system that may be used to implement aspects of the disclosed embodiments.

The disclosed embodiments relate generally to determining context for values interspersed among the content of different messages that may be characterized at most by a sender, a recipient, and a time, the messages having subsets of related, but arbitrary content. A context for each value may be determined based on the content of other messages, the format of the values, the personal profiles of the parties involved, prior trades, and/or market data. The context for the values is used to assist in generation of a conversation state that tracks a conversation of interest. When the conversation state approaches or achieves a completed state, a function may be initiated based on the values stored within the conversation state.

Traders and brokers communicate using different forms of communication, sometimes using structured communications, sometimes using natural language or unstructured communication. Instant messaging or Chat messaging (sometimes referred to as IM or "IMing") is commonly used to communicate between computer users (multi-party or one to one) in a pseudo-instantaneous manner. Commercial messenger applications exist and are used frequency such as WhatsApp, Facebook messenger, AIM and WeChat, among others. Proprietary applications exist as well and may be supported and maintained by an exchange or other entity. Such applications run on a number of different platforms including personal computers (PCs), mobile phones, PDAs or other environments. Chat differs from ordinary e-mail in that there is immediacy in the message exchange. Chat makes a continued exchange of messages simpler than sending e-mail back and forth. Chat communications may be text-only or include images or moving pictures.

Chat may be used to communicate instructions to a trader who in turn performs securities trading functions on behalf of clients. It is beneficial to use chat functions for communicating time-sensitive information as chat is near instantaneous. In order to communicate instructions, chat systems may use structured messages that encode trade parameters. A structured message may be composed of ordered values in a specified sequence or containing values with identifiers. A structured message may be formatted to facilitate processing of the information contained within. An example of a structured message may be: "Price=50". The message contains an identifier "Price=" and a value. A non-structured message may not contain any identifiers and may be composed of unstructured information. An example of an unstructured message may be "How about 50?" The unstructured message does not contain an identifier to give context to the value 50. In a system that uses chat to perform purchases (e.g., in an order management system), chat messages may be used to place, confirm, and place orders for securities. By adding structure to the chat message, applications such as pricing systems, risk management systems, order management systems, etc. can receive and process business critical data contained within the chat message because the modified chat message contains structure that may be easily parsed. Unstructured chat, however, may not be usable as the content has no structure and therefore may not be semantically parsed by a computing system. Unstructured chat that spans multiple disparate messages further complicates encoding trade parameters as there may be no inherent context between values and/or messages. The information that ties the messages together: sender, recipient, and time may be insufficient on their own to derive a completed trade from a chat message.

Certain line by line parsing may be used in chat applications. When traders enter trade or quote information, the trade or quote information may be translated from a text entry to a data entry that conforms to any number of market data formats. However, line by line parsers lack the ability to derive context between messages and from unstructured messages. Each message must contain every piece of information or the line by line parse will fail to generate a correct transaction. When conversations, i.e., multiple interspersed subsets of related messages, about multiple different products take place within the same chat client, there may be confusion over which values correspond to which products. When a single chat client receives messages from multiple different traders related to possibly multiple different products, there does not exist a system for distinguishing which messages in a chat environment are associated with which products. Further, there does not exist a system that tracks the state of a conversation, updating and replacing values when contextually implied. Chat/IM clients do not relate separate message threads or relate together discontinuous subsets of messages which have some form of relationship. In the example used above, a structured message such as "Price=50" is easy to parse. An unstructured message "How about 50?" may not be parsable by a line by line parser. However, a system that tracks the state of a conversation and uses contextual clues from other messages or sources may be able to derive a context for the message "How about 50?" and extract useable information.

Embodiments described herein may extract context from a chat environment to enable generation of a conversation state. A conversation state may be generated from values and the context of the values parsed from two of more messages. The relationships of the values to a conversation state may be derived from contextual clues and information stored in a trading system. The context or relationship of the values must be determined as the values may be arbitrarily spread over different messages along with unrelated or conflicting values.

The disclosed embodiments may be implemented to increase the timing and efficiency in the computational system. Interleaved conversational threads may be tracked. Values and conversational states may be provided efficiently and accurately without additional user input. The increased efficiency and decreased usage of resources may lead to additional trading, fewer communication errors, and less human error.

One exemplary environment where monitoring and parsing chat communications is desirable is in financial markets, and in particular, electronic financial exchanges, such as a futures exchange, such as the Chicago Mercantile Exchange Inc. (CME). In particular, an exchange may offer multiple products and contracts for purchase that may be entered into using the order tickets.

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancelations, etc., in a manner as expected by the market participants, such as based on market data, e.g., prices, available counter-orders, etc., to provide an expected level of certainty that transactions will occur in a consistent and predictable manner and without unknown or unascertainable risks. In addition, it should be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

As was discussed above, electronic trading systems ideally attempt to offer an efficient, fair and balanced market where market prices reflect a true consensus of the value of products traded among the market participants, where the intentional or unintentional influence of any one market participant is minimized if not eliminated, and where unfair or inequitable advantages with respect to information access are minimized if not eliminated.

Although described below in connection with examples involving instruments having multiple components, such as calendar and butterfly spread instruments, the methods described herein are well suited for determining final values for any variety of objects conforming to a set of rules or relationships.

Generally, the disclosed embodiments may be applicable to any computer processing system that is constrained by a variety of rules and data values. When a computer processor attempts to compute a large number of data sets in an environment including rules constraints and data constraints, the number of possible solutions or combinations of values can become unwieldy. The disclosed embodiments allow for the computer processing system to accurately parse and efficiently provide order tickets to users. The disclosed embodiments allow for greater efficiency for end users, less processing time spent on parsing, and quicker generation of orders allowing the market to function efficiency.

The disclosed embodiments may be applicable to contracts for any type of underlier, commodity, equity, option, or futures trading system or market now available or later developed. The disclosed embodiments are also not limited to intra-market spread instruments, and accordingly may also be used in connection with inter-market spread instruments for contracts associated with different commodities.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of generating an order ticket. The disclosed embodiments may be used for monitoring multiple messages and building a transaction or function based on information included within a set of separate messages.

The methods and systems described herein may be integrated or otherwise combined with various risk management methods and systems, such as the risk management methods and systems described in U.S. Pat. No. 7,769,667 entitled "System and Method for Activity Based Margining" (the '667 Patent"), the entire disclosure of which is incorporated by reference herein and relied upon. For example, the methods and systems described herein may be configured as a component or module of the risk management systems described in the above-referenced patent. Alternatively, or additionally, the disclosed methods may generate data to be provided to the systems described in the above-referenced patent. For example, the settlement prices determined by the disclosed embodiments may be incorporated into margin requirement(s) determined by the risk management method or system.

In one embodiment, the disclosed methods and systems are integrated or otherwise combined with the risk management system implemented by CME called Standard Portfolio Analysis of Risk™ (SPAN®). The SPAN system bases performance bond requirements on the overall risk of the portfolios using parameters as determined by CME's Board of Directors, and thus represents a significant improvement over other performance bond systems, most notably those that are "strategy-based" or "delta-based." Further details regarding SPAN are set forth in the '667 Patent.

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the example computer 200 described below with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market. A market data module 112 may be included to collect market data and prepare the data for transmission to users.

A risk management module 134 may be included to compute and determine a user's risk utilization in relation to the user's defined risk thresholds. The risk management module 134 may also be configured to determine risk assessments or exposure levels in connection with positions held by a market participant.

The risk management module 134 may be configured to administer, manage or maintain one or more margining mechanisms implemented by the exchange computer system 100. Such administration, management or maintenance may include managing a number of database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios, as described below.

An order processing module 136 may be included to decompose delta-based, spread instrument, bulk and other types of composite orders for processing by the order book module 110 and/or the match engine module 106. The order processing module 136 may also be used to implement one or more procedures related to clearing an order.

A settlement module 140 (or settlement processor or other payment processor) may be included to provide one or more functions related to settling or otherwise administering transactions cleared by the exchange. Settlement module 140 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 140 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 140 may be used to determine a mark to market amount on a daily basis during the term of the financial instrument. Such determinations may also be made on a settlement date for the financial instrument for the purposes of final settlement.

In some embodiments, the settlement module 140 may be integrated to any desired extent with one or more of the other modules or processors of the exchange computer system 100. For example, the settlement module 140 and the risk management module 134 may be integrated to any desired extent. In some cases, one or more margining procedures or other aspects of the margining mechanism(s) may be implemented by the settlement module 140.

A chat module 142 may be included to provide one or more function relating to monitoring and parsing communications between parties. The chat module 142 may generate order tickets from parsed communications. The chat module 142 may be configured to parse communications. The chat module 142 may monitor communications directly or indirectly. The chat module 142 may reside on the exchange or be a part of the chat application located at each client installation. The chat module 142 may be implement at the server of a chat service provider. The chat module 142 may be connected to the exchange over a network.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described above, the disclosed embodiments may be implemented as a centrally accessible system or as a distributed system, e.g., where some of the disclosed functions are performed by the computer systems of the market participants.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via Wi-Fi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described below with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user. In another example, the exemplary computer device 118 may include a non-transitory computer-readable medium that stores instructions for predicting and/or publishing a current response time or current match engine latency as described herein.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Figure 2:
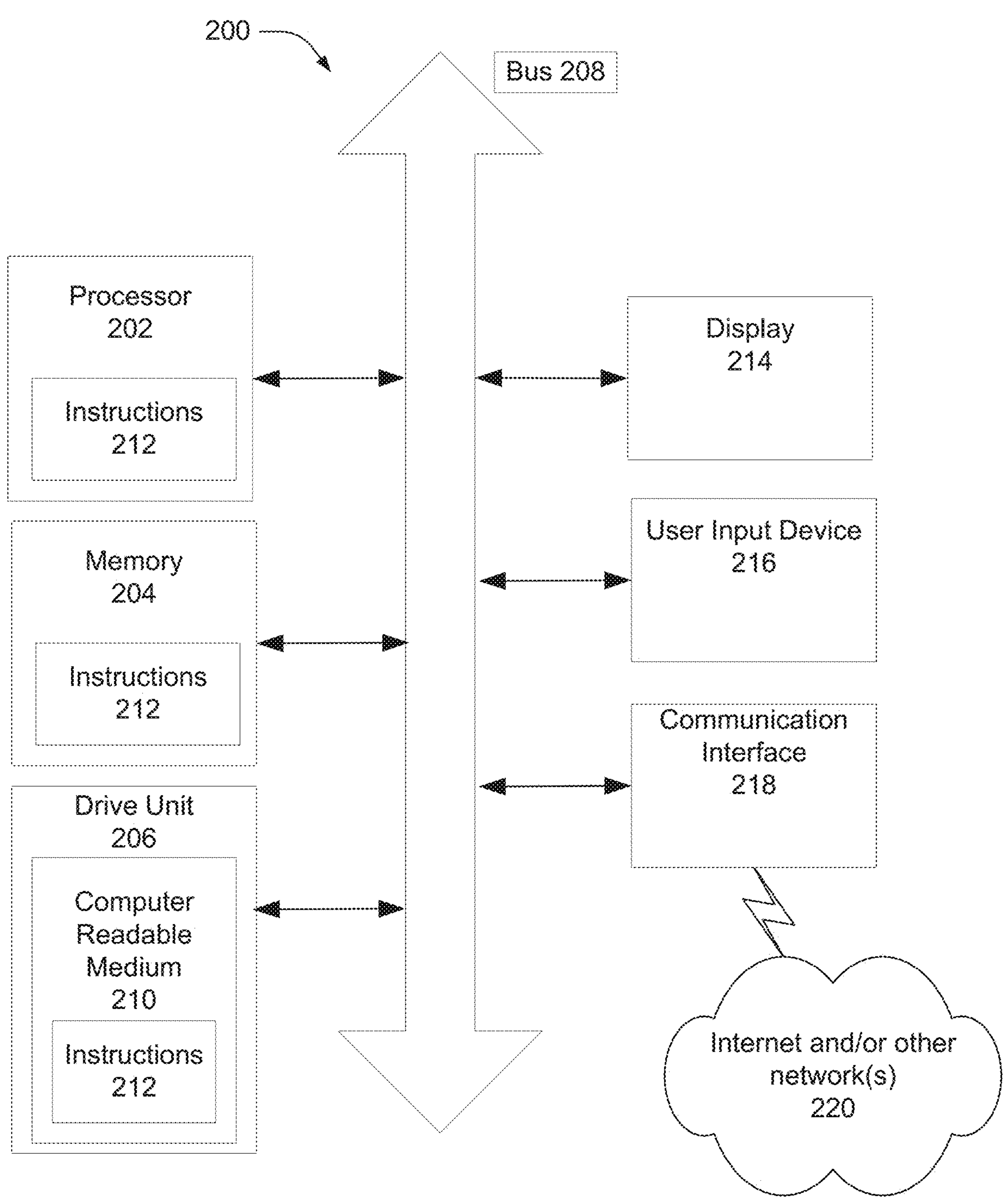
FIG. 2 depicts an illustrative embodiment of a general computer system for use with the disclosed embodiments.

Referring to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification may be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. A system may depend on certain rules, logic, and inter-related objects and data. In technical and computing environments, a system may calculate values for multiple objects subject to rules, e.g., business or environment logic, associated with the objects. Certain object types may also depend on other object types.

Figure 3:
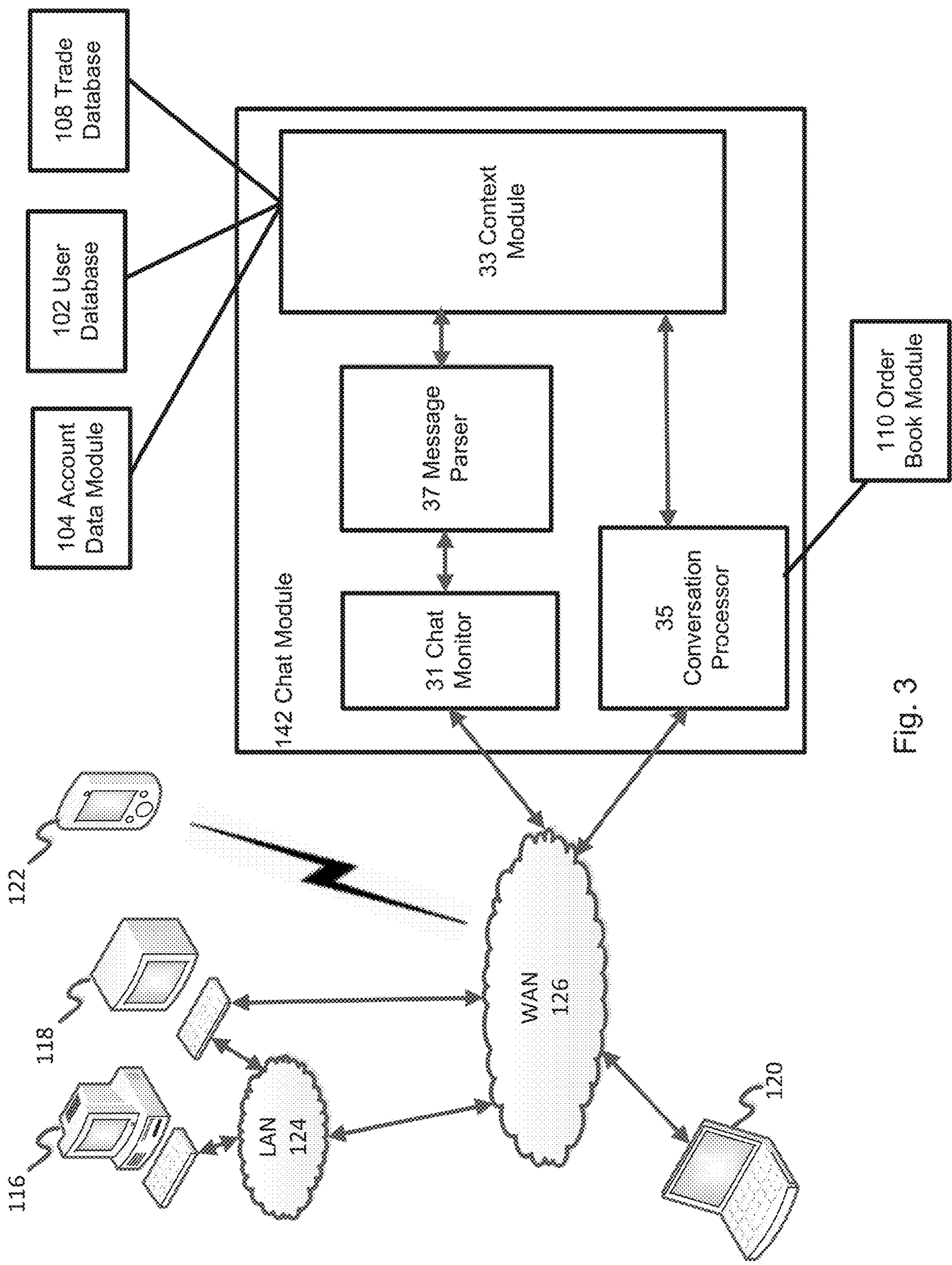
FIG. 3 depicts an illustrative example of a chat module of the computer network system of FIG. 1.

FIG. 3 depicts an illustrative embodiment of a chat module 142. FIG. 3 includes a chat monitor 31, a context module 33, a conversations processor 35, and a message parser 37. The chat module 142 may be connected to systems or machines outside the exchange system. The chat module 142 may communicate with users, traders, and brokers outside of the exchange system, such as via wide area network 126 and/or local area network 124 and computer devices 114, 116, 118, 120 and 122. The chat module 142 may be configured to monitor a chat communication, parse the communications, identify context of the values within the communications, and generate one or more conversation states relating to a function based on the values and the context of the values. The chat module 142 may be implemented in part as an application on one of the computer devices 114, 116, 118, 120 and 122. The chat module 142 may be part of the exchange computer system 100.

The chat monitor 31 may be configured to monitor chat communications between parties over a network. The message parser 37 may be configured to parse messages that are monitored by the chat monitor 31. The context module 33 may be configured to receive one or more values from the parsed message and identify a context for the values. The context module 33 may be configured to identify a relationship between a value and a data element. The conversation processor 35 is configured to store conversation states. The conversation processor 35 receives values from the context module 33 and using the associated context, assign the values to a relevant conversation state. When a conversation state contains sufficient values, the conversations processor 35 completes the conversation, performs a function, and provides, for example, a completed order ticket to a user interface for confirmation. The conversations processor 35 may identify when the conversation contains sufficient values and may prompt a user to provide any additional information required to generate a completed order ticket.

The chat monitor 31 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the chat monitor 31 to, or otherwise be operative to monitor a plurality of messages.

The message parsing module may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the message parsing module to, or otherwise be operative to identify from the plurality of messages, one or more values.

The message parser 37 may use a standard off the shelf or a proprietary parser. The message parser 37 may only parse a single message at a time (e.g., a line by line parser). The message parser 37 may parse and identify as based on structural (sequence/order, spaces, delineating characters (punctuation, capitalization)), known key words), or grammatical (nouns, verbs) indicators/clues separate components (characters, numbers, and symbols) of a chat communication. The relationships of each of the components to one another may be stored in memory alongside the components. For example, the location of a component in a message or the order of the components may be stored.

The context module 33 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the context module 33 to, or otherwise be operative to identify context for the one or more values.

The context module 33 may be in communication with one or more databases of the exchange. The one or more databases, such as a user database, may contain data that assists the context module 33 in determining a relationship between an identified value and a conversation state. The context module 33 may be configured to determine relationships between values from separate messages in the plurality of messages. Each message from the plurality of messages may be parsed by the message parsing module to generate one or more components (potentially values). The context of the components may then be determined for each component (or value). For example, a value in a first message may be related to a second value in a second message. The context of each value and message and resulting relationships may be derived from the format of each message, the format of the value, the profiles of the parties involved, market data, and machine learning techniques. The context module 33 applies one or more rules to each value and message to determine the context. The context module 33 operates statefully, across messages, i.e. the current message and past messages. The context module 33 may transmit the values and the context to the conversation processer 33.

The conversation processor 35 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the conversation processor 35 to, or otherwise be operative to generate conversation states for the plurality of messages.

The conversation processor 35 may be configured to generate, store, and verify conversation states. A conversation state may be defined as a template that specifies particular items (product, price, quantity, side) of related information necessary to enable, programmatically, a function, such as the placement of an order. The template may include one or more data structures or one or more data objects. A value for each of the particular items or data elements may be stored in one or more data structures (e.g., in separate registers, memories or memory locations), each data structure corresponding to a conversation. For example, the register for product may store a value, a register for price may store a value, and so on.

In operation, the context module 33 may determine that a message has no relation, e.g., because the participants are different or no different identifiable elements are found, to a prior message. The conversation processor 35 may initiate a new conversation state, a new instance of the template wherein the relevant message elements are filled in as new related values are extracted. The context module 33 may determine that the message relates to a prior message, based on the participants and/or based on an identifiable element of the message. The context module 33 may determine that a value relates to the conversation state based on the context proximate to the value. The context module 33 and/or conversation processer may determine that the message includes additional message elements to further define the conversation state, e.g., further fill in missing information of the template. Once the template contains all of or a threshold (sufficient) amount of the necessary information, the conversation processor 35 may initiate an action, e.g., an order ticket may be presented to a user. Multiple template instances may be "in process" at any given time.

Figure 4:
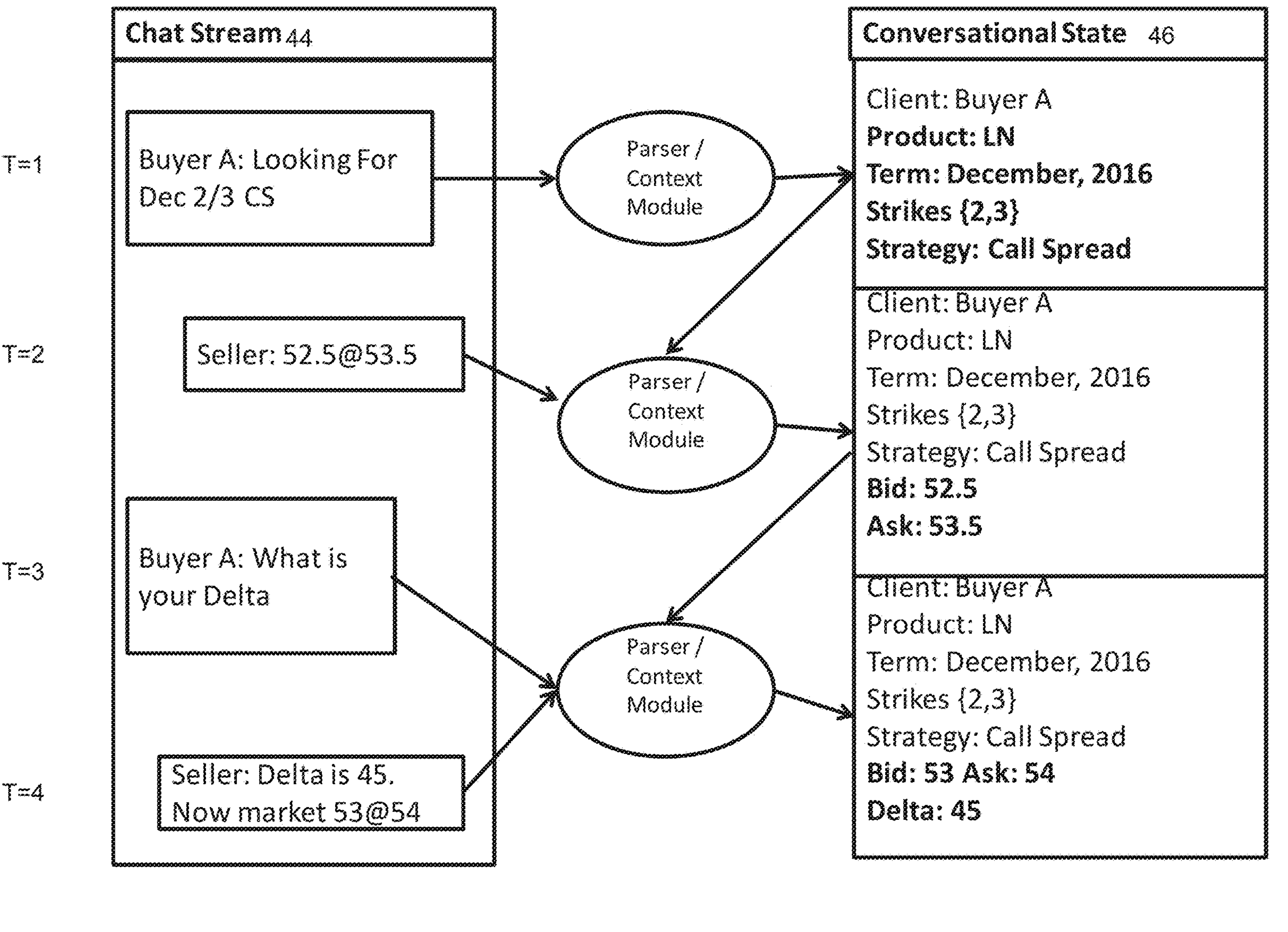
FIG. 4 depicts an illustrative example of tracking a state of a conversation.

FIG. 4 depicts an example of an updating conversation state 46 derived from an instant message conversation. The chat monitor 31 receives the four messages from the chat message 44 in that respective order at the time periods T=1, T=2, T=3, and T=4. The first message from Buyer A states: "Looking for December 2/3 CS." The second message from Seller states 52.5@53.5. The third message from the Buyer asks: "What is your Delta." In the fourth message the seller replies: "Delta is 45. Now market 53@54."

The message parser 37 parses each of the message of the chat messages 44 as they are monitored by the chat monitor 31. The context module 33 determines the context of each message and the values contained within. As illustrated by FIG. 4, the parser and context module may function together. The parser uses information from the context module to identify values. The context module uses information from the parser to generate context. The conversation processor 35 stores the conversation state 46 as it evolves over the conversation.

As depicted in FIG. 4, the first message is parsed to identify the values. The context of the values is determined. The values and context are entered into a conversation template that stores the conversation state. After the first message, the conversation state includes the client is Buyer A (derived from the chat participants), the product is LN (potentially derived from the history or profiles of Buyer A and the Seller), the Term is December 2016 (derived from the "Dec" value and imputed to 2016 based on context, e.g. when the message was time stamped and past orders), the strategy is call spread (derived based on the value in the message).

The second message 52@53.5 is then parsed and a context is determined. Using the existing information in the conversation template, the context module 33 may be able to determine that 52@53.5 relates to a bid/ask range. The context module 33 may further use market data to identify the context.

The third message "what is your delta" does not contain a value but may be used to determine the context of the fourth message. Since the third message appears to be a request for information, the contents of the fourth message may contextually be identified as the information requested. Here, the fourth message is explicit in stating that "Delta is 45." Additionally, the fourth message includes a new market value. The conversation state is now Buyer A, Product LN, Term December 2016, 2,3 Strikes, call spread strategy, with a bid of 53, ask 54 and a delta of 45.

The conversation may continue until the conversation template reaches a state that is complete, the conversation template includes sufficient values for required data elements. At this point, an action may be taken to generate an order ticket including the values.

In certain embodiments, the conversation state 46 may be displayed via a graphic user interface to a user as each of the plurality of messages is received. The display of the conversation state 46 may include one or more fields that a user, using the interface, may fill in manually to generate a value for a data element rather than await a message containing the particular information.

The system may determine that a message (or value within the message) has no relation to a conversation state, e.g., because the participants are different or no different identifiable elements are found, to a prior message and initiate a new conversation state, a new instance of the template wherein the relevant message elements are filled in. Or the invention may determine that the message relates to a prior message, based on the participants and/or based on an identifiable element of the message, and includes additional message elements to further define the conversation state, e.g., further fill in missing information of the template. Once the template contains all or a threshold amount of the necessary information, the action may be initiated, e.g., a completed order ticket may be presented to the user. Multiple template instances may be "in process" at any given time involving communications between multiple users.

The conversation processor 35 may be configured to store one or more combinations of data elements relating to an incomplete template. As the conversation processor 35 receives additional values from the context module 33 that have a relationship to the order ticket, the conversation state changes to include the additional values. In certain embodiments, the output of the conversation processor 35 is a completed order ticket. The conversation states and template may be related to an incomplete order ticket, e.g., an order ticket that is missing a value or has an ambiguous value for one or more required data elements. Required data elements may include data elements such as product, price, quantify, side, etc. Alternative data elements may be used or required depending on the type of action or trade or order ticket.

In certain embodiments, the context module 33 and conversation module may communicate with the user database 102, the account data module 104, the trade database 108, the order book module 110, and/or the market data module 112. The user database 102, the account data module 104, the trade database 108, the order book module 110, and/or the market data module 112 may include data that may assist in determining a context of a data element, a value, or a conversation.

The user database 102 may be configured to store data relating to chat participants. The user database 102 may, for example contain data relating to a linguistic style of a user, e.g., what specific words or phrases mean. The account data module 104 may be configured to store data relating to one or more accounts. The account data module 104, for example, may include data that identifies what products a user of an account trade on. The account data module 104 may additionally include data specific to an account rather than a single user. The trade database 108 may be configured to store prior trades relating to one or more data elements or one or more chat participants. The trade database 108 may include contextual information such as the last trade between the parties (which product, what strategy, quantity, etc.). Parties may have assumed values for certain data elements such as the product, term, or quantity. While these values may not be mentioned during a chat, they may be assumed based on the history between the parties. Assumptions such as a trader only trades in blocks of 100 may be updated as new information is received. The order book module 110 and the market data module 112 may be configured to store information relating to current or historical market data. Both modules may be used to identify ranges of values for data elements.

Figure 5:
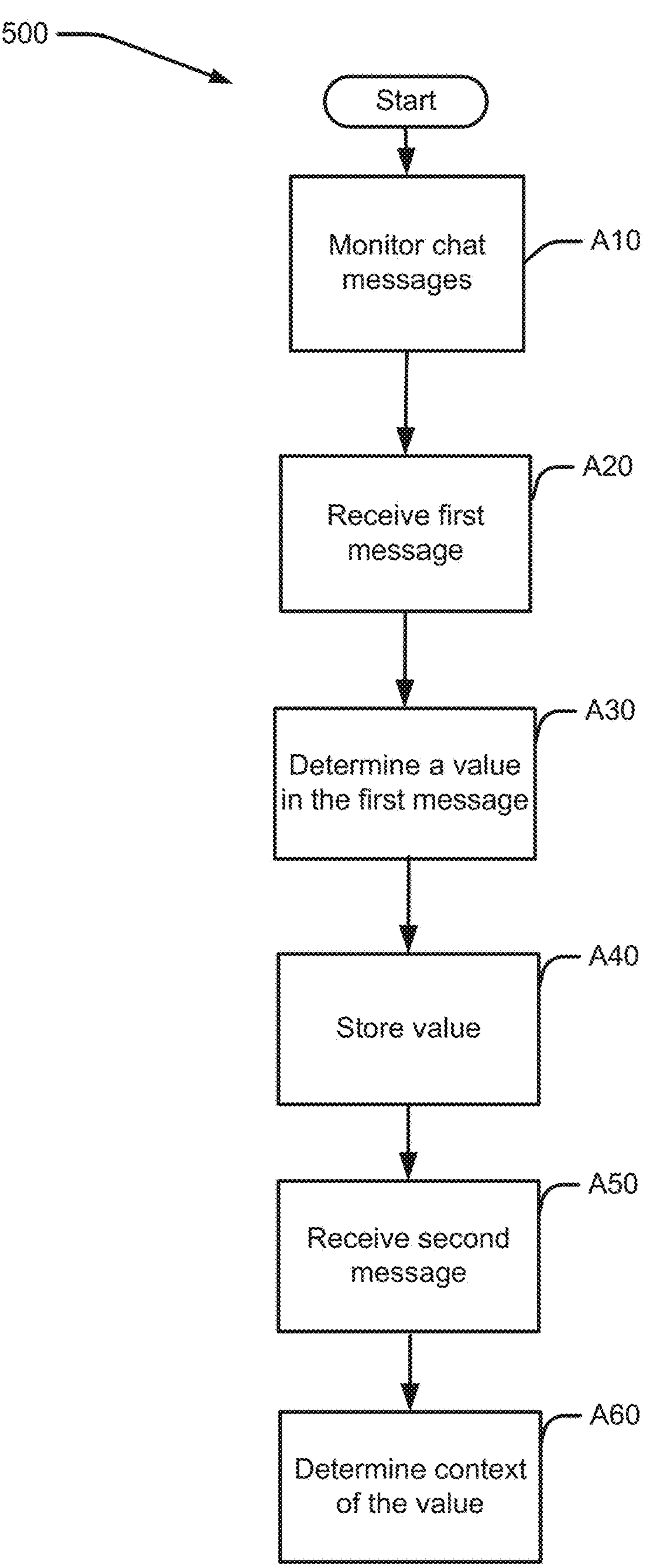
FIG. 5 depicts an example flowchart indicating a method of implementing the disclosed chat module.

FIG. 5 depicts an example workflow of the operation of the chat module 142 of FIG. 3. The workflow in FIG. 5 may be used to parse a plurality of communications using contextual clues found in content of the messages and information stored in the user database 102, the account data module 104, the trade database 108, the order book module 110, and/or the market data module 112.

At act A10, the chat module 142 monitors communication of messages between a first party and a second party, wherein a subset thereof relates to one or more transactions, each characterized by a set of data items, each of which requires a value. The messages between a first party and a second party may include content such as values related to one or more transactions. The one or more values included in the message may be indeterminate as to their meaning or relationship to other data values. The messages may alternatively or further contain phrases or natural language.

The chat module 142 may monitor communications for three or more parties participating in a chat. Using, for example, a group chat function, large numbers of parties may participate in a chat. As a result, messages may or may not be directed between a first party and a second party, but rather between multiple parties. A request for a quote may be intended by a sender to be seen and responded to by multiple other parties in the group chat. Each group chat may include an administrator, who may be responsible for adding or removing participants. Different levels of permissions may be granted to different participants. Parties in a group chat may simultaneously chat one on one with another party while chatting in the group chat. In the example given above, a request for a quote may be sent to the group. The sender may only receive replies back on a one to one basis. The chat module 142 may monitor each of the individual chats and groups chats and derive context from both.

At act A20, the chat module 142 receives a first message communicated between the first party and the second party. Messages may include a sender, recipient, and a timestamp. The sender, recipient, and timestamp information may be used to determine a context for any values included in the first message. The first party or the second party may be the sender of the first message. The first party and/or the second party may be the recipient of the second message. The first party and second party may be participants in a group chat include additional parties. Messages transmitted by any parties to the group chat may be received by all parties. In an example, the first party may send the first message to the group chat. The first message may be received by all parties to the chat including the second party.

At act A30, the chat module 142 determines whether the first message contains a value for at least one of the set of data items of one of the one or more transactions, the first message either not otherwise specifying which of the data items or which of the one or more transactions the value is for. For example, the first message may only contain a single value without context. The value may be matched with one or more data items based on a format. For example, if the value is a number, the data item may be a quantity or price. If the value is a series of characters, the data item may be a product. A parser may parse the message separate characters, phrases, and values. The message may be parsed based on alternative criteria such as a linguistic database including common trader or broker phrases.

At act A40, the chat module 142 or parser may extract the value and store the value in a buffer.

At act A50, the chat module 142 receives prior to or subsequent to the first message, a second message communicated between the first party and the second party. The first party and second party may be participants in a group chat include additional parties. Messages transmitted by any parties to the group chat may be received by all parties. In an example, the first party may send the second message to the group chat. The second message may be received by all parties to the chat including the second party. The second message may or may not be related to the content of the first message. The content of the second message may be parsed similarly to the first message. The parser may identify any phrases or values in the second message.

At act A60, the chat module 142 determines whether the second message comprises data identifying which of the set of data items and/or which of the one or more transactions, the stored value is a value for, and if so, identifying the stored value as the value of that particular item of the set of data items. Values or phrases parsed from the second message along with other external data such as market data, user profiles, prior trades, etc. may be used to determine a context for the first and second messages. If for example, the second message includes a value relating to a product and the first message includes a numeric value, the chat module 142 may communicate with a market data module 112 to determine if the numeric value might relate to a price of the product.

In certain embodiments, the chat module 142 may generate an order ticket once all of the values for each of the data items for a transaction have been identified and stored in the buffer. Each transaction may require certain data items. For example, a simple trade may require party information, product, price, and quantity. The party information may be derived from the chat participants. The product, price, and quantity may be identified in a chat communication using the workflow described above.

In certain embodiments, the chat module 142 may be configured to display the order ticket or the contents of the buffer to one or more of the chat participants. In certain embodiments, the chat may involve three or more parties.

Table one below illustrates an example plurality of messages (stream of messages) between a broker and a trader. The context of each of the message is described below. The context for each message or value may be derived from information from the other messages and information stored in the user database 102, the account data module 104, the trade database 108, the order book module 110, and/or the market data module 112.

TABLE 1

| | |
|---|---|
| 1 | Broker: (Feb. 10, 2016 2:45:46 PM): WTI Z6 45/48 PS vs 4820 22 delta |
| 2 | Trader: (Feb. 10, 2016 2:46:05 PM): 123-128 |
| 3 | Broker: (Feb. 10, 2016 2:47:21 PM): 124/125 |
| 4 | Broker: (Feb. 10, 2016 2:48:00 PM): our bid |
| 5 | Trader: (Feb. 10, 2016 2:48:50 PM): 100 at 5 |
| 6 | Trader: (Feb. 10, 2016 2:49:10 PM): actually 200 at 5 |
| 7 | Broker: (Feb. 10, 2016 2:49:53 PM): 124's trading we leave 471 |
| 8 | Trader: (Feb. 10, 2016 2:50:31 PM): no cares |
| 9 | Broker: (Feb. 10, 2016 2:51:07 PM): we leave 371 |
| 10 | Broker: (Feb. 10, 2016 2:51:21 PM): all trade |
| 11 | Broker: (Feb. 10, 2016 2:51:38 PM): 4's and 5's |
| 12 | Trader: (Feb. 10, 2016 2:51:51 PM): ah ok |

TABLE 1-continued

| | |
|---|---|
| 13 | Trader: (Feb. 10, 2016 2:51:53 PM): fair |
| 14 | Trader: (Feb. 10, 2016 2:52:05 PM): I'd still sell 5s |

The first message from the broker to the trader states: "WTI Z6 45/48 PS vs 4820 22 delta." The message may be interpreted as broker asking for either an IOI (Indication of Interest) or RFQ (Request For Quote) on the package, which is a Crude Oil December 2016 45/48 strike Put spread which includes selling December 2016 crude oil future at a price of $48.20, on a "22 delta" (which means the ratio of futures contracts). A message parser 37 and context module 33 may be able to identify each value from this line. A conversation state may be generated based on the values.

The second message is a reply from the trader to the broker. The second message contains the component "123-128." Using data from the market module, the values may correspond to the trader's market $1.23 bid, at $1.28 offer. The trader doesn't include the size or quantity. Depending on the relationship between broker and market maker and using associated profiles, there is likely an assumption of a minimum, e.g., 50up, 100up, etc.

The broker replies with "124/125." In this message, the broker replies that there is a better market out there, as tight as it can be, just 1-tick wide, $1.24 bid at $1.25 offer. The broker follows up this message with the next line "our bid" indicating that the broker is representing the bid side here, $1.24, though the quantify is still indeterminable.

In the next message (5), the trader responds, improving the original offer from $1.28, by stating that the trader would join the offer at $1.25 with a 100 contracts. A simple message parser 37 may be unable to use this message. The response, "100 at 5" which if evaluated as a single line is almost meaningless, but using the context that the current best market is $1.24-$1.25, the context module 33 may conclude "100 at 5" is referring to the "$1.25", or "5" offer.

The trader corrects his previous message by increasing the offer size to 200 contracts, so now the trader is offering 200 contracts at $1.25. The 100 quantity from the previous message may be overwritten by the new value of 200. The 100 value may be stored temporarily to use as context or in case the conversation reverts to the old value.

In the next message (7), the broker writes "124's trading we leave 471." The broker may be informing the trader that the bid side ($1.24) is getting hit. The 471 may refer to the remaining contracts. This value "471" may be indeterminate.

The trader replies "no cares", generally meaning that the trader doesn't care at that level. This message includes no values but may be used for context.

The broker updates that another 100 traded, down to 371 in the next message.

The broker updates again stating that the broker is all complete at $1.24

The broker adds additional information to previous comments stating "4's and 5's." Using the context from previous messages, the broker is stating that the market is no longer $1.24-$1.25, that the $1.24 bid was hit and all traded, and although it is a bit less clear, that the $1.25 offer either sold at the $1.24 level or faded (went away).

The trader acknowledges the update.

The trader in the final message (14) informs the broker that the $1.25 offer of 200 contracts is still good, despite the change in market state.

Figure 6:
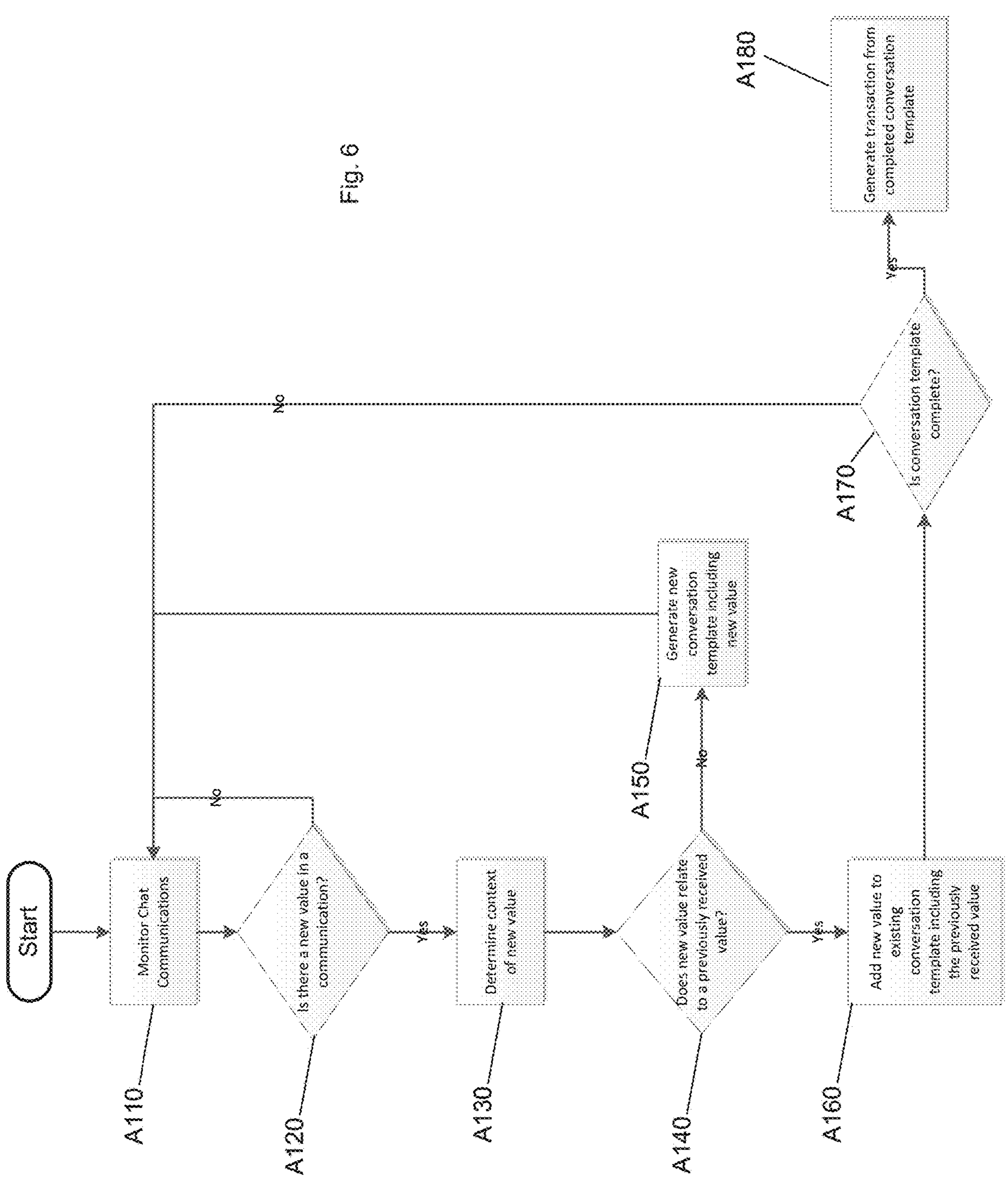
FIG. 6 depicts an example flowchart indicating a method of implementing the disclosed chat module.

FIG. 6 depicts an example workflow 600 of the operation of the chat module 142 of FIG. 3. The workflow in FIG. 6 may be used to parse a communication such as that in Table 1 using contextual clues found in content of the messages and information stored in the user database 102, the account data module 104, the trade database 108, the order book module 110, and/or the market data module 112.

At A110, the chat monitor 31, monitors a stream of communications, e.g. two or more chat communications involving a first party and a second party. The chat communications may include additional parties. The chat communication may take place during a single time period or over multiple periods. The chat communications may be archived or stored in memory. Each message may include explicit values (such as message 1 from table 1 above) or may include other content, some of which may be used to derive a context for the values (message 8 above in table 1). The chat monitor 31 may identify a sender, a recipient, and a timestamp of each message.

At A120, the message parser 37 determines if there is a new value in a communication. Each message may contain one or more components. The components may include words, phrases, values, images, or symbols. Each component may be identified by the message parser 37. The message parser 37 may use the format of each component to determine if the component relates to a data element. A number, for example, may relate to a data element such as price or quantity. A word or acronym may relate to a product. In certain embodiments, the message parser 37 may not be able to determine which specific data element the value relates to. The specific type of data element may be determined by the context module 33.

At A130, the context of the new value is determined by the context module 33. The context for each value may be derived from information from the messages and information stored in the user database 102, the account data module 104, the trade database 108, the order book module 110, and/or the market data module 112.

At A140, a determination is made if the new value relates to a previously received value. Based on the context of the value and/or message, the new value may be assigned to an existing conversation state. A conversation template may track the state of a conversation of interest. A conversation of interest may be a collection of data elements that are related to a specific data element or function. For example, a conversation of interest may revolve around a potential order ticket for MSFT. Data elements for such a conversation may be the product (already known-MSFT), the parties (may be assumed or derived from the participants), the price, and the quantity. The conversation template tracks each of the values received for each of the data elements over time. When the conversation template reaches a set point the values may be outputted as a function such as an order ticket. Each conversation template may have one or more required data elements in order to be sufficiently completed. The conversation template may include additional information.

If the new value does not relate to a previously received value, at A150, a new conversation template is generated including the new value. Multiple conversation template may exist in time. A chat communication may reference multiple products or potential order tickets. A conversation template may be generated for each separate conversation of interest.

If the new value does relate to a previously received value, at A160, the new value is added to an existing conversation template that includes the previously received value. For example, a conversation template may include the product MSFT. A message includes a value that contextually may relate to a price of the product MSFT. The value may then be added to the conversation template, updating the state of the conversation to include the value. The conversation state may now include the product and price. The quantity may not be known at this time.

At A170, a determination is made if the conversation template is complete. Each conversation of interest may require values for certain data elements to be complete. In the example above, the parties, a product, a price, and a quantify may be required. The parties may be identified (participants in the chat), the product may be identified (MSFT), the price may be identified, however, the quantify is still missing. The conversation template has not reached a state to where it is sufficient to generate an order ticket. The chat module 142 may await further values from the plurality of messages.

If the conversation template is complete, at A180, a transaction may be generated from the values in the conversation template. Alternative actions may be taken when the conversation template is complete. Additionally, the chat module 142 may require further input (such as a confirmation) to generate a completed order ticket.

In certain embodiment, the conversation template may be provided to one or more of the chat participants. The conversation template (detailing the state of the conversation) may displayed inside or outside the chat interface. One or more of the participants may be able to directly enter values for data elements.

When applied to a financial exchange computer system, the embodiments described herein may utilize trade related electronic messages such as instant messages, chat programs, email, or other electronic messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. As used herein, an exchange 100 includes a place or system that receives and/or executes orders.

It should be appreciated that the disclosed embodiments may use other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX Binary, FIX/FAST, or by an exchange-provided API.

Figure 7:
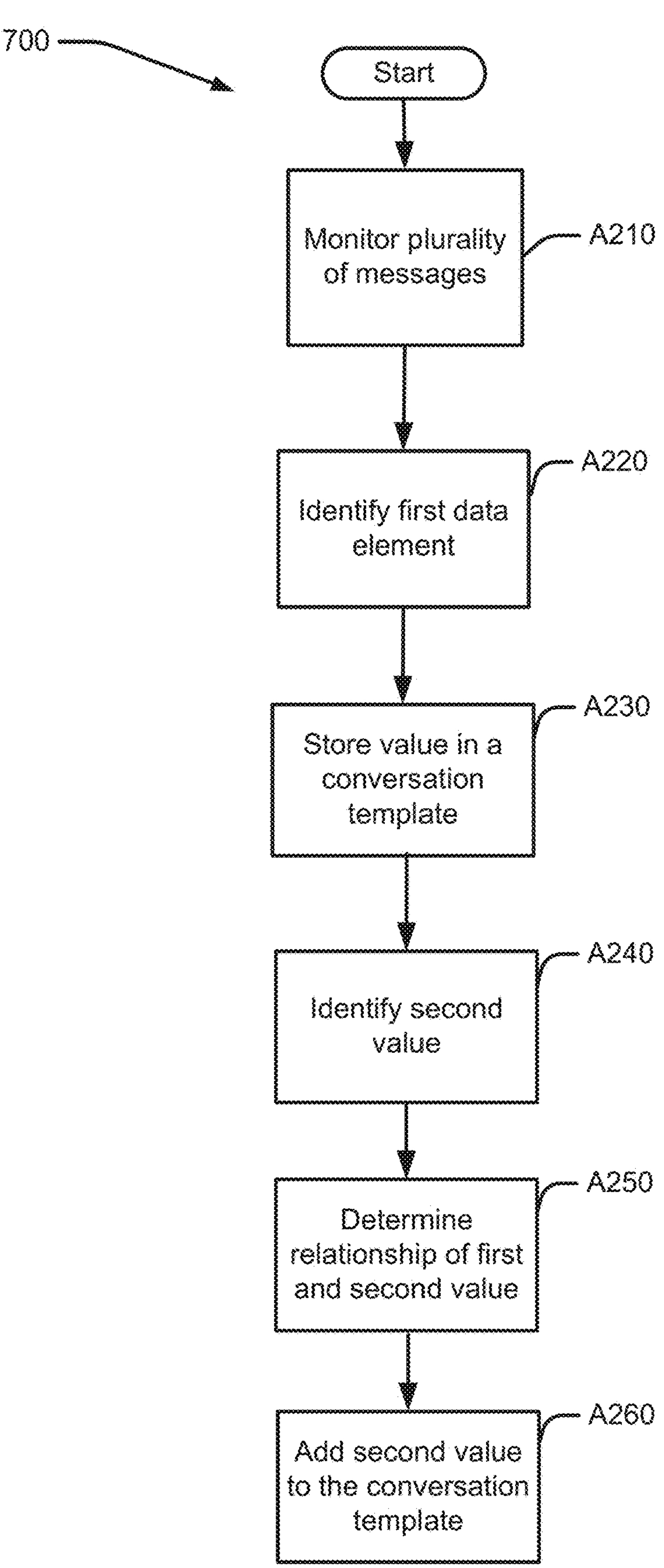
FIG. 7 depicts an example flowchart indicating a method of implementing the disclosed system for context based messaging.

FIG. 7 depicts a workflow 700 for tracking a conversation state in a plurality of messages as may be implemented with computer devices and computer networks, such as those described with respect to FIGS. 1 and 2. Embodiments may involve all, more or fewer actions indicated by the blocks of FIG. 7. The actions may be performed in the order or sequence shown or in a different sequence.

At act 210, a plurality of messages including messages related to a conversation of interest and messages not related to the conversation of interest are monitored. The plurality of messages may include communications between two or more parties. The conversation of interest may relate to a potential order or trade. The conversations may include communications in a group chat setting. A group chat may involve three or more parties. Messages in a group chat may be received by all participants in the group chat. Each group chat may involve the same or different sets of participants. For example, a group chat may include parties A, B, C, and D. A second group chat may include parties A, C, D, and E. Parties may be invited to or may leave group chats at any time. Participants in a group chat may possess different rights for different tasks. Certain participants may not be able to see certain messages between certain parties. Certain participants may not be able to post messages at certain times. Each participant may message each other participant outside of the group chat. A message sent directly to another participant may not be seen by other parties.

At act A220, a first data element in a first message of the plurality of messages relating to the conversation of interest is identified. The plurality of messages may include two or more chat messages communicated including a first party and a second party. Chat clients or IM applications may be commonly used by traders for over the counter financial products. The messages communicated may be characterized only by an identity of a sender, an identify of one or more recipients, and a timestamp. The content of the communications may further include elements that relate to a conversation of interest. Each additional element may build on the conversation. The state of a conversation may be defined as a template that specifies particular data elements (product, price, quantity, side) of related information necessary to enable, programmatically, a function, such as the generation and placement of an order. Each message may relate to one or more different conversations. For example, a group message from first party may potentially relate to potential different conversations for each of the parties to the group chat. Depending on the number of participants, a single message may be potentially related to tens or hundreds of different conversations. As the data elements and context of the data elements and message are identified, the number of relevant conversations may be limited.

Each message in the plurality of message may be parsed to identify one or more data elements (if one exists). Each data element may include a value. For a data element such as price, the value may be a numerical value. For a data element such as product, the value may be a name of the product, a ticker symbol or shorthand for the name of the product. The data elements may correspond to fields or objects in a conversation, for example, fields in an order or trade. In an example such as described above in FIG. 4, a single message may recite "Looking for LN December 2/3 CS." The message may be parsed in order to identify the components [looking for]—a common phrase that may be used for context; [LN]—potentially a data element that represents a product; [December]—potentially a data element that represents a date; [2/3]—potentially a data element related to strikes; and [CS]—potentially a data element relating to a strategy. Depending on the message parser 37, only the data element may be identified. Certain message parser 37*s* may go further and identify the type of data element. The output of a parse of a message may be a series of values that may or may not be data elements and any information that describes how each value is used in the single message.

Once a data element (and/or value) has been extracted from a message, the context of the data element and the message may be determined. Relationships may be discerned based on inter-message element relationships, e.g., that a value for a data element specified in one message is within a range of values specified in another (prior or subsequent) message. For example, in an environment with multiple threaded conversations about different products, the system may recognize context based on price ranges of the products. A data element relating to price with a value of 45.5 by itself lacks context. The system may use previous messages that have established all possible products the price value may relate to. For example, previously mentioned products may have price ranges of 3.5-10.5, 40.5-50.5, and 102.4-120.4. Given these ranges, the system can understand the context in which a price value of 45.5 exists, and then generate a relationship between that value and a product that has been previously mentioned, and also amend any previous message contexts.

Inter message contextual clues or relationships may include: where one message defines a unique subset of things and a prior/subsequent message specifies something which can only be an element of that unique subset; where one message specifies a query and a subsequent message specifies a response to that query. Inter-message relationships may be recognized based on characteristics of the sender or recipient, such as based on order history, profile information, or linguistic patterns.

For a group chat message, the different contextual clues may have different meanings for different parties. Each message may be parsed to determine which of the group chat participants are relevant. For example, in a group chat with 10 participants, a message may only relate to 3 of the participants even though each of the 10 may receive the message.

Each message, taken from a one to one chat or group chat may be individually analyzed against each other potentially relevant message in order to identify contextual clues and relationships between values or the messages.

At act A230, the value of the first data element is stored in a conversation template. The conversation template may require a currently unknown value from a second data element in order to enable a function. For example, if the function was to complete an order ticket, the conversation template may require a product, a quantity, and a price to be sufficient. The system may continue to monitor the plurality of messages. Messages may be related to the conversation of interest, related to a different conversation of interest, or not related to any conversation of interest. Many of the messages may be unrelated chatter or casual conversation.

In certain embodiments, a data element may be overwritten in the conversation template. In an example, a trader may indicate a first price. The first price may be rejected by the recipient of the message. The trader may indicate a second price. Both the first price and second price are both related to the conversation of interest. However, the conversation of interest may only use one of the prices. In this case, the subsequent second price would overwrite the first price in the conversation state as the first price was an older value. Other methods may be used to determine which value is to be stored.

At act A240, a second value in a second message subsequent to the first message is identified. The second message may be from either the first party or second party. The second message may be the next subsequent message after the first message between the first party and second party. There may be messages in between the first and second messages. The in between messages may be parsed similarly to the first and second message. Each message may be parsed to identify data elements and values. One or more interpolated messages may either not contain any data elements (for example, the phrase "did you see the Knicks win the championship?") or contain data elements that are related to a different conversation of interest. Certain messages may include incorrect information or have not contextual value.

At act A250, the second value is determined to be related to the first value. For each identified data element or value, a context may be determined. The context may relate to one or more ongoing conversations. For example, an identified value that is a pricing data element may be related to a conversation regarding a product. The context and relationship of the pricing data element and the conversation may be determined using the pricing range of the product and whether or not the value of the pricing data element is within that range. Other context clues may be included in the messages or in the order of the message (or components of the message). For example, if prior messages had requested a price for the product, the subsequent pricing data element may likely relate to the product. The relationship may not be as clear-cut as there may be several intervening messages or data elements. In an embodiment, the data element may only be included in a conversation if a threshold context is reached. For data elements that do not meet or exceed the threshold, the data elements may be stored in a new conversation or reevaluated at a later time once additional information has been parsed from the message stream. The threshold context may be based on a scoring system that takes into account each of the factors used.

The relationship and or context of the messages and data elements may be determined by using several factors. These factors may include formatting, market data, environment, user profiles, and prior trades.

The formatting of the data may include an amount or order of the characters and symbols that are included in the value. For example, a data value of [IBM] most likely would indicate a product and not a price. Whereas a data value of [55.2] may indicate a price. A data value such as 52.5@53.5 may indicate a bid/ask range due to the format and order of the characters. Each data element of a conversation template may have a specific format. Products may be formatted using generally characters, terms, or dates such as months may have a specific name or format.

The market data may be used to determine if a data value is related to conversation. For example, a product AB may have had a recent price in a range of 50-55. A data element that has a value of 90 will most likely not be the price for product AB. If the other factors surround the data element suggest that the data is indeed a price, the data element may be related to a separate conversation. Alternatively, the data element may indeed be related to the initial conversation, but not as the price, but for example, as the Delta.

The environment may be used to determine context of a message or data element. The environment may include other component or data elements in a message or messages that are proximate. Messages may include plain language pointers that identify the type of subsequent or previous data element. The phrase: "the delta is 40" is a clear indication that the value 40 represents the delta. Likewise, if a previous message had asked "what is your delta" and the subsequent message just included the value "40", the value most likely corresponds to the delta.

User profiles may be used to determine the context of a message or data element. The user profile information may include data relating to past trades, linguistic styles, and prior communications (IM, email, etc.). A user, for example, may only trade a specific product. A user may use a specific phrase when discussing price. One user may use the phrase "ok" to have a first meaning. A second user may use the phrase "ok" to means something else. Past trade between parties, past trades for a product, and market data may also be used to determine the context of a message or data element.

At act A260, the conversation template is completed using the second value for the second data element. In certain embodiments, the conversation template may require values for a third, a fourth, or additional data elements in order to be sufficient. Different conversations may require different data elements in order to be sufficient. A sufficient conversation template may include sufficient values to generate an order.

In certain embodiments, the conversation state may be provided to a user as the conversation moves from state to state. A display interface may include an indicator that displays the current developing state of active conversation states or template instances. The display interface may display the conversations the system has identified, the elements the system has extracted in each conversation and what information is still missing in order to enable the function, e.g. the order. The user may be able to select this "indicator" and manually fill in the missing information and/or correct any captured information which is not correct or which the user wishes to modify. The display interface may indicate when the system is confused or unable to determine a context or element and request user input to assist.

For example, uncompleted conversation templates may be generated and provided to the parties prior to being completed. The current state of the conversation for example, may be displayed with one or more empty fields representing a missing value. A user may manually enter in the value for the field to complete the conversation or advance to an updated state.

In an embodiment, an additional trigger may be required to complete the conversation template. Once a template instance/conversation state is filled in, the system may await a trigger message/element or other user action to trigger/initiate the action wherein until that trigger is received subsequent messages may include elements which augment or modify previously received data in the template instance.

In an embodiment, an order ticket may be generated from the conversation template. The order ticket may be provided to the parties. The order ticket may be displayed to both parties with a confirmation input. The order ticket may be displayed only one party depending on the context of the received data elements. For example, a prior message may serve as confirmation from one party prior to the conversation template being completed. An order ticket may be display inside of a chat interface or in a separate window. The order ticket may include a button to transmit the order to the order book module.

The order ticket may use a Financial Information exchange (FIX) protocol. The FIX protocol is a standard for exchange of such types of information in the securities field. Examples of alternative protocols include FIX Binary, FIX/FAST, an exchange-provided API, FIXML (FIX adapted to XML) and FPML. Accordingly, an OMS provides a useful measure of technology-based communication between the various brokers, between a broker and a brokerage, and between a brokerage and other brokerages, the exchanges, etc.

Figure 8:
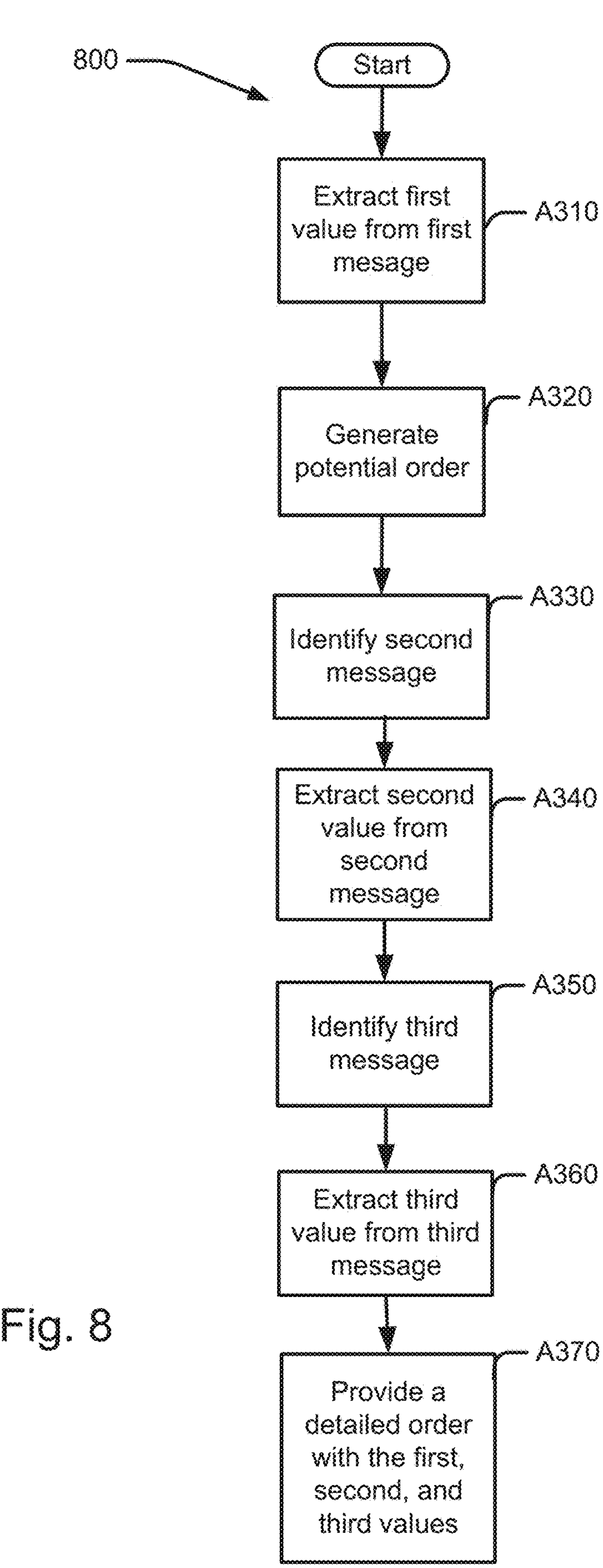
FIG. 8 depicts an example flowchart indicating a method of implementing the disclosed system for monitoring and tracking a plurality of chat communications.

FIG. 8 depicts an example workflow 800 for generating a completed order ticket as may be implemented with computer devices and computer networks, such as those described with respect to FIGS. 1, 2, and 3. Embodiments may involve all, more or fewer actions indicated by the blocks of FIG. 8. The actions may be performed in the order or sequence shown or in a different sequence.

At act A310, a first value relating to a first data element is extracted from a first message including a first party and second party. The first message may be a one to one message between the first party and the second party. The first message may a group chat message wherein the first party or the second party generates the message and the first party or the second party receives the message. Values may be identified from one or more parsed components of a message. Each of the components may be identified and compared against known data elements fields. Combinations of words or phrases may be identified. Alternative forms of communication such as emoji, images, movable pictures may be identified. The type of value may be derived by the message parser 37 or by the context module 33. The message parser 37 may use simple formatting to determine what type a value is. The context module 33 may use additional information and the message structure to determine the context. The context may indicate which data element if any the value is related to. The context may further be used to identify how values related to one another and how message relate to one another.

The message parser 37 may transmit each of the identified values (along with any identification information) to the context module 33. The context module 33 may identify one or more relationships the identified values have with previously or concurrently received values. An example message as described above may be: "Looking for LN December 2/3 CS." The message may be parsed in order to identify the components [looking for], [LN], [December], [2/3], and [CS]. The phrase "looking for" generally may mean a request for a quote. LN may be related to any number of phrases or data elements. Here, because LN follows directly after "looking for" there is an increased possibility that LN relates to a product. Other information such as the trading tendencies or linguistic style of the sender of the message may be used to determine the correct data element that the value LN applies to. [December] generally relates to the month December. Additional support for this analysis may be based on if LN is a product and if or if not December is a term for LN. The components [2/3] and [CS] may be identified based on the other components in the message. Additionally, the profile of the sender may be used to identify which types of strategies that the sender prefers.

Each of the components may have a different meaning if used in other circumstances. Additionally, without further information the actual phrase could have a different meaning. Each value may be provisionally assigned to a data element until the message parser 37 or context module 33 can verify the identification. Data values or context from other subsequent or prior messages may be used to either back up or repudiate how the values are assigned to data elements. Any values identified may be transmitted to a conversation processor 35.

At act A320, a potential order is automatically generated that includes the first value. An order may require certain values to be completed. For example, a simple buy order may require the product name, a price, and a quantity. Each of the values may be received in separate messages. When one of the values is identified by the message parser 37 or context module 33, the conversation processor 35 generates a potential order using the value. The other values not known may be left as null. In certain embodiments, the values may be provisionally entered based on historical data or user profile data. For example, a buyer who only trades one product may have that field entered into when a seller sends a price as long as the price meets a determined price range of the current market for the product.

At act A330, a second message between the first party and second party is identified as relating to the potential order. The second message may be the next subsequent message after the first message. Alternatively, additional non-related messages may be interspersed between the first and second messages. The second message includes a second data element. The second message may be parsed to determine one or more components (including values, possibly related to a data element). The one or more components may be transmitted to the context module 33 to determine the relationship of the components and/or message. Using information such as the format of the components, the environment, user profiles, trading profiles, market data, the context module 33 may determine that the second message includes components relating to the potential order generated at act A320. Alternatively, the message parser 37 or context module 33 may determine the second message does not contain any related values or no values at all. If the second message has non-related values, the conversation processor 35 may attempt to locate a related potential order, or if none are found, generate a new potential order.

At act A340, a second value relating to the second data element is extracted. The second value may be added to the potential order by the conversation processor 35.

At act A350, a third message between the first party and second party is identified as relating to the potential order. The third message may be the next subsequent message after the second message. Alternatively, additional non-related messages may be interspersed between the second and third messages. The third message includes the third data element. The third message may be parsed to determine one or more components (including values, possibly related to a data element). The one or more components may be transmitted to the context module 33 to determine the relationship of the components and/or message. Using information such as the format of the components, the environment, user profiles, trading profiles, market data, the context module 33 may determine that the third message includes components relating to the potential order generated at act A320. Alternatively, the message parser 37 or context module 33 may determine the third message does not contain any related values or no values at all. If the third message has non-related values, the conversation processor 35 may attempt to locate a related potential order, or if none are found, generate a new potential order.

In certain embodiments, the third message may contain a third value related to the second data element. For example, in a conversation, parties may go back and forth on price. A price value extracted above at act A340 may be overwritten by a newer value.

At act A360, a third value relating to the third data element is extracted. The third value may be added to the potential order by the conversation processor 35.

At act A370, a detailed order is generated based on the potential order and including values from the first data element, the second data element, and the third data element. A detailed order may be referred to as a completed order ticket. A detailed order may include all the values required to transmit a trade to an exchange or order book. In certain embodiments, act A370 may await a trigger message or other user action to trigger the order generation. Until the trigger message (such as a confirmation) is received subsequent messages may include elements which augment or modify previously received data in the template instance.

Figure 9:
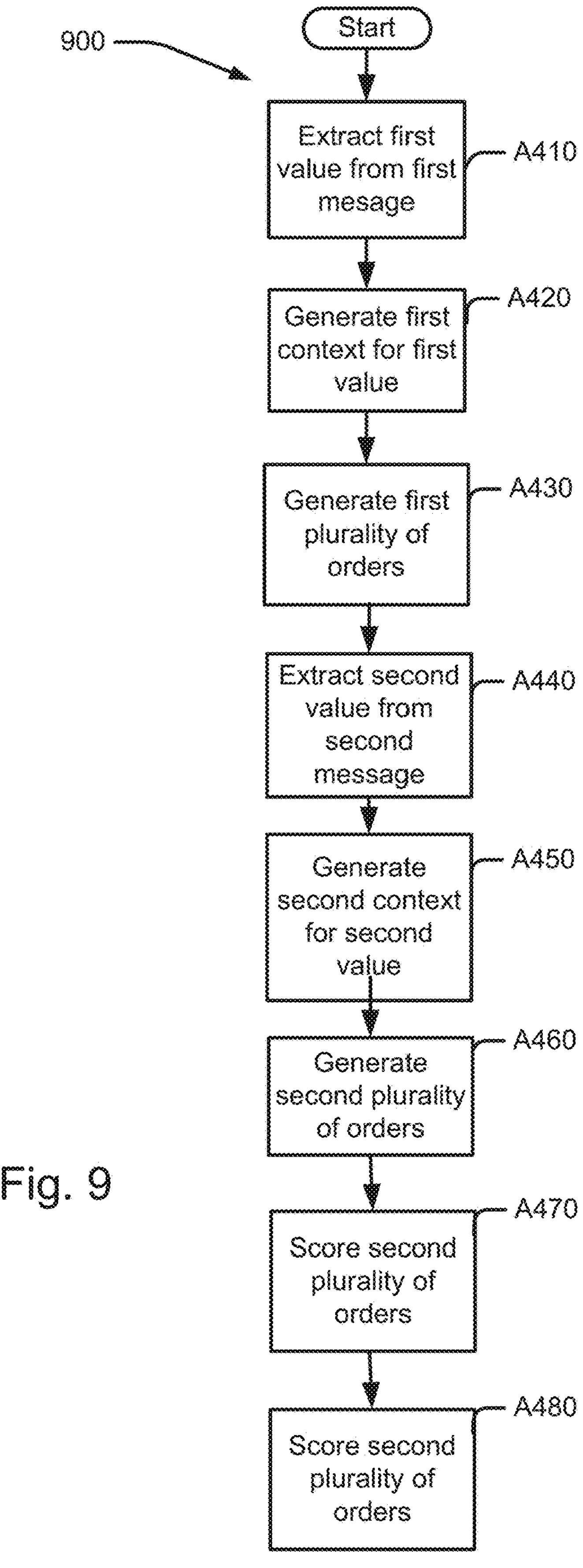
FIG. 9 depicts an example flowchart indicating a method of implementing the disclosed system for monitoring a plurality of chat and scoring potential orders.

FIG. 9 depicts an example workflow 900 for generating a plurality of potential orders from one or more values identified in a plurality of messages as may be implemented with computer devices and computer networks, such as those described with respect to FIGS. 1, 2, and 3. Embodiments may involve all, more or fewer actions indicated by the blocks of FIG. 9. The actions may be performed in the order or sequence shown or in a different sequence.

At act A410, a first value is identified in a first message between a first party and a second party. The first value may be related to one or more data elements. The first message may be a group chat message between multiple parties including the first party and the second party. A group chat message may have one sender but multiple recipients.

At act A420, a first context is generated for the first value. The context of the first value may indicate that the first value relates to a specific data element (for example, price or a product name). The context may also identify how the first value relates to other values in the plurality of messages and/or the messages. The context of the first value may not be 100% certain. For example, a single number value may relate to multiple different data elements. The first context may be used to identify the relevant parties (the first party and the second party) out of larger group of parties participating in a group chat.

At act A430, a first plurality of potential orders is generated including the first value. Using the first context, a plurality of potential orders may be generated. For example, if the first value relates to a product, potential orders that relate to the product may be generated.

At act A440, a second value is identified in a second message between the first party and the second party. The second value may be related to one or more data elements.

At act A450, a second context is generated for the second message. The context of the second value may indicate that the second value relates to a specific data element (for example, price or a product name). The context may also identify how the second value relates to other values (such as the first value) and other data elements in the plurality of messages and/or the messages. The context of the second value may not be 100% certain. For example, a single number value may relate to multiple different data elements such as price or quantity.

At act A460, a second plurality of potential order are generated as a subset of the first plurality of potential orders that include the second value. For example, if the first value is related to a product, the first plurality of potential orders may be each order that includes the first value. If, for example, the second value is related to price, then each of the second plurality of potential orders would include both the product of the first value and the price of the second value. If the context of the second value was uncertain, for example, if the second value may relate to either a price or quantity, the second plurality of orders would include all orders with the first value as the product and the second value as either the price or quantity.

At act A470, the second plurality of potential orders are scored based on the first and second context. In certain embodiments, the processor may be unable to determine a relationship between values or messages with certainty. In an embodiment, values from each message may be assigned an affinity score based on the relationship between multiple values. The affinity score may be generated using information relating to the user profiles for each party, past trades, previously received values, and trader linguistics.

The affinity score may return a binary result; the value is or is not related to a previous value. The affinity score may use a scale to describe the potential relationship between a first value and a second value. The scale, for example, may be from 1 to 100; 1 indicating that the first value and second value are not related; 100 indicating that the first value and second value are definitely related. The affinity score may be used to connect multiple values together. Each value may include one or more affinity scores either relating to different values or different potential order tickets.

A score may be used to determine the plausibility of one or more potential orders. For example, two orders may be generated relating to a first value of a first data element (e.g. MSFT). A second value is identified from a subsequent message. The second value may be a price or a quantity for the potential order. The contextual data for the first value, the second value, and the messages in the message stream may be used to score each potential order. Both orders, for example, may be possible, but the potential order using the second value as a price may be determined to be the intended order.

A score may be used to determine which parties the values may be related to. In a group chat, there may be multiple parties exchanging messages. Each message, including the data values may be relevant to multiple different potential orders. The score may be used to determine which potential orders relate to which parties.

Machine learning may be used to fine tune the decision process instead of, or alongside using a scoring system. The contextual data for each value may be store with the result; the result, for example, representing a transmitted order ticket. If, for example, the At act A480, a third plurality of potential order are provided including potential orders from the second plurality of potential orders that score above a threshold. The threshold may be set to exclude potential orders that are unlikely. For example, only the highest scoring potential order may be provided. Alternatively, the top three, or top five, top 10%, top 50% or other percentage or count may be used.

Figure 10:
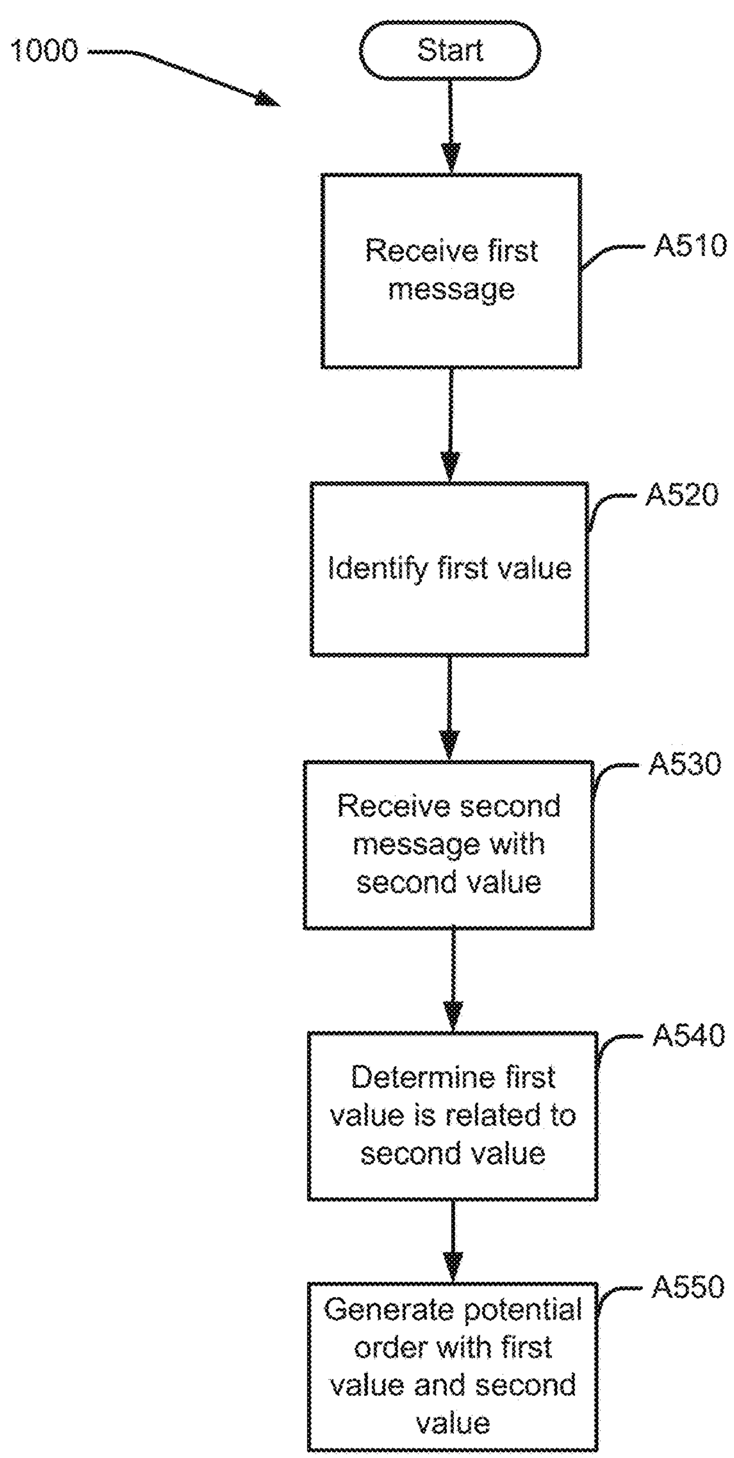
FIG. 10 depicts an example flowchart indicating a method of implementing the disclosed system for monitoring a plurality of chat communications.

FIG. 10 depicts an example workflow 1000 for generating a potential order from a plurality of messages as may be implemented with computer devices and computer networks, such as those described with respect to FIG. 1, 2, or 3. Embodiments may involve all, more or fewer actions indicated by the blocks of FIG. 10. The actions may be performed in the order or sequence shown or in a different sequence.

At act A510, a first message is received. A plurality of chat messages may be monitored. The plurality of chat messages may include two or more messages between a first party and a second party that relate to a conversation. The chat messages may be message in group chat. A group chat may include multiple parties including the first party and the second party. The two or more messages may be messages transmitted to and received by the multiple parties including the first party and the second party. The first party or the second party may be a transmitter of at least one of the two or more messages.

The first message may include a value that relates to a data element. For example, the value may be a number, the data element may be price. The value may be a symbol or phrase; the data element may be a product.

At act A520, a first value for a first data element is identified in the first message. Values may be identified by parsing the message and then determining the context of the value, the message, or both. The context may be determined based on the content of the message, the content of other messages in the plurality of chat messages, or contextual information from information stored in the user database 102, the account data module 104, the trade database 108, the order book module 110, and/or the market data module 112.

At act A530, a second message in the plurality of messages is identified that includes a second value. The second message may be the next subsequent message after the first message. Other messages in the plurality of chat message may be received between the first and second messages. The second message may include a value that relates to a data element. For example, the value may be a number, the data element may be price. The value may be a symbol or phrase; the data element may be a product.

At act A540, the second value is determined to be related to the first value. The relationship between the first and second values may be determined based on the content of the message, the content of other messages in the plurality of chat messages, or contextual information from information stored in the user database 102, the account data module 104, the trade database 108, the order book module 110, and/or the market data module 112.

At act A550, one or more potential orders are generated using the first value and the second value. The one or more potential orders may be order tickets for placing an order for a product on an exchange. The one or more potential orders may be completed order tickets or incomplete order tickets. The one or more potential orders may be displayed to one or more users either in the chat interface or in a separate window.

Although some of the examples discussed herein relate to futures contracts and associated spread instruments, the disclosed embodiments for the optimization module may be applicable to options contracts, and in particular, to strike prices options contracts. For example, each options contract may include multiple strike prices, and an exchange system may receive multiple values for each strike price for an outright options contract. Moreover, even after the settlement module processes the received values, the exchange may have the choice of selecting one of multiple values for the strike prices for the options contracts. Thus, the optimization module may convert or translate each strike price for each options contract into a base object. The system may also convert spread instruments between strike prices into composite objects.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:

monitoring, by a processor coupled with an electronic communications network, a plurality of messages communicated between first and second parties in a virtual communications environment via the electronic communications network, wherein the processor is a hardware processor;

identifying, by the processor, in the plurality of messages, a first message communicated from the first party to the second party, the first message including a first image;

extracting, by the processor, the first image from the first message;

determining, by the processor, that the first image relates to a first data element from the first message, wherein determining that the first image relates to the first data element includes:

determining, by the processor, a context of the first image from prior messages stored in a user database; and determining, by the processor, from the context of the first image, that the first image relates to the first data element;

generating automatically, by the processor, a potential order that requires values from the first data element and a second data element;

identifying, by the processor, in the plurality of messages, as relating to the potential order, a second message communicated from the second party to the first party and including a second image, wherein identifying, as relating to the potential order, the second message, includes identifying contextual information in the second message that relates to the first message;

determining, by the processor, that the second image relates to the second data element;

extracting, by the processor, the second image from the second message;

determining, by the processor, based on a content of one or both of the first and second messages, that the second image relates to the first image;

parsing, by the processor, the first and second images respectively, and based thereon, extracting first and second values respectively for the first and second data elements; and providing automatically, by the processor, a completed order based on the potential order and including the first and second values for the first and second data elements.

2. The computer implemented method of claim 1, wherein determining the context is based on at least one of a content of the first message, the content of other prior messages stored in a user database, or contextual information from information stored in the user database.

3. The computer implemented method of claim 1, wherein determining that the first image is related to the second image is based on at least one of the content of the first and second messages, the content of other prior messages stored in a user database, or contextual information from information stored in the user database.

4. The method of claim 1, wherein identifying as relating to the potential order, a second message, comprises:

identifying market data derived from the first image; and comparing the market data to the second data element.

5. The computer implemented method of claim 1, wherein the second message is communicated subsequent to the first message.

6. The computer implemented method of claim 1, wherein the plurality of messages include a plurality of chat messages.

7. The computer implemented method of claim 6, wherein a group chat message includes the plurality of chat messages.

8. The computer implemented method of claim 1, further comprising:

determining, by the processor, based on a respective format of the first and second images that the first and second images relate to the first and second values including a number and that the first and second data elements include a price.

9. The computer implemented method of claim 8, wherein determining that the second image is related to the first image comprises:

identifying a range of prices for the second data element that relate to the first image; and determining if the second image is within the range of prices.

10. The computer implemented method of claim 1, further comprising:

determining, by the processor, based on a respective format of the first and second images, that the first and second images relate to the first and second values including a symbol or a phrase and that the first and second data elements include a product.

11. The computer implemented method of claim 1, wherein determining that the second image is related to the first image comprises:

identifying contextual information proximate to the second message that relates to the first message.

12. The computer implemented method of claim 1, wherein other messages in the plurality of messages are received between receipt of the first and second messages.

13. The computer implemented method of claim 1, wherein the potential order includes an order ticket for placing the completed order for a product on an exchange.

14. The computer implemented method of claim 1, wherein the potential order is displayed on a user interface coupled with the processor and displaying the data elements, values and images presently associated therewith.

15. The computer implemented method of claim 14, wherein the user interface comprises a chat interface.

16. The computer implemented method of claim 14, wherein the user interface is configured to receive inputs including the images to generate the first and second messages.

17. The computer implemented method of claim 1, wherein the first and second images include emojis and movable pictures.

18. A system comprising:

a processor and a memory coupled therewith and storing computer executable instructions that when executed by the processor cause the processor to:

monitor a plurality of messages communicated between first and second parties in a virtual communications environment via an electronic communications network;

identify, in the plurality of messages, a first message communicated from the first party to the second party, the first message including a first message;

extract the first image from the first message;

determine that the first image relates to a first data element from the first message, wherein the computer executable instructions further cause the processor to:

determine a context of the first image; and determine from the context of the first image, that the first image relates to the first data element;

generate automatically a potential order that requires values from the first data element and a second data element;

identify, in the plurality of messages, as relating to the potential order, a second message communicated from the second party to the first party and including a second image, wherein the computer executable instructions further cause the processor to identify contextual language in the second message that relates to the first message;

determine that the second image relates to the second data element;

extract the second image from the second message;

determine, based on a content of one or both of the first and second messages, that the second image relates to the first image;

parse, by the processor, the first and second images respectively, and based thereon, extracting first and second values respectively for the first and second data elements; and provide automatically a completed order based on the potential order and including the first and second values for the first and second data elements.

19. The system of claim 18, wherein the computer executable instructions further cause the processor to determine the context based on at least one of a content of the first message, the content of other prior messages stored in a user database, or contextual information from information stored in the user database.

20. The system of claim 18, wherein the computer executable instructions further cause the processor to determine that the first image is related to the second image based on at least one of the content of the first and second messages, the content of other prior messages stored in a user database, or contextual information from information stored in the user database.

21. The system of claim 18, wherein the computer executable instructions further cause the processor to identify as relating to the potential order, a second message, by:

identifying market data derived from the first image; and comparing the market data to the second data element.

22. The system of claim 18, wherein the second message is communicated subsequent to the first message.

23. The system of claim 18, wherein the first and second images are extracted by parsing the first and second messages respectively.

24. The system of claim 18, wherein the plurality of messages include a plurality of chat messages.

25. The system of claim 24, wherein a group chat message include the plurality of chat messages.

26. The system of claim 18, wherein the computer executable instructions further cause the processor to determine, based on a respective format of the first and second images, that the first and second images relate to a number, and that the first and second data elements include a price.

27. The system of claim 26, wherein determining that the second image is related to the first image comprises:

identifying a range of prices for the second data element that relate to the first image; and determining if the second image is within the range of prices.

28. The system of claim 18, wherein the computer executable instructions further cause the processor to determine, based on a respective format of the first and second images, that the first and second images relate a symbol or a phrase, and that the first and second data elements include a product.

29. The system of claim 18, wherein determining that the second image is related to the first image comprises:

identifying contextual information proximate to the second message that relates to the first message.

30. The system of claim 18, wherein other messages in the plurality of messages are received between receipt of the first and second messages.

31. The system of claim 18, wherein the potential order includes an order ticket for placing the completed order for a product on an exchange.

32. The system of claim 18, wherein the potential order is displayed on a user interface coupled with the processor and displaying the data elements, values, and images presently associated therewith.

33. The system of claim 32, wherein the user interface comprises a chat interface.

34. The system of claim 32, wherein the user interface is configured to receive inputs including the images to generate the first and second messages.

35. The system of claim 18, wherein the first and second images include emojis and movable pictures.

36. A system comprising:

means for monitoring a plurality of messages communicated between first and second parties in a virtual communications environment via an electronic communications network;

means for identifying, in the plurality of messages, a first message communicated from the first party to the second party, the first message including a first image;

means for extracting the first image from the first message;

means for determining that the first image relates to a first data element from the first message;

means for determining a context of the first image;

means for determining from the context of the first image, that the first image relates to the first data element;

means for generating automatically a potential order that requires values from the first data element and a second data element;

means for identifying, in the plurality of messages, as relating to the potential order, a second message communicated from the second party to the first party and including a second image;

means for identifying contextual language in the second message that relates to the first message;

means for determining that the second image relates to the second data element;

means for extracting the second image from the second message;

means for determining, based on a content of one or both of the first and second messages, that the second image relates to the first image;

means for parsing the first and second images respectively, and based thereon, means for extracting first and second values respectively for the first and second data elements; and means for providing automatically a completed order based on the potential order and including the first and second values for the first and second data elements.

* * * * *